United States Patent
Ko et al.

(10) Patent No.: US 12,179,316 B2
(45) Date of Patent: Dec. 31, 2024

(54) JIG APPARATUS FOR MANUFACTURING VEHICLE SEATS

(71) Applicant: HYUNDAI TRANSYS INC., Seosan-si (KR)

(72) Inventors: Jae Yong Ko, Suwon-si (KR); Seung Keon Woo, Yangsan-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 525 days.

(21) Appl. No.: 17/453,958

(22) Filed: Nov. 8, 2021

(65) Prior Publication Data
US 2022/0153366 A1    May 19, 2022

(30) Foreign Application Priority Data

Nov. 17, 2020   (KR) .................. 10-2020-0153306

(51) Int. Cl.
| | |
|---|---|
| B25B 11/02 | (2006.01) |
| B25H 1/08 | (2006.01) |
| B25H 1/10 | (2006.01) |
| B60N 2/58 | (2006.01) |
| B62D 65/14 | (2006.01) |

(52) U.S. Cl.
CPC ............. B25B 11/02 (2013.01); B25H 1/08 (2013.01); B25H 1/10 (2013.01); *B23P 2700/50* (2013.01); *B60N 2/5891* (2013.01); *B62D 65/14* (2013.01)

(58) Field of Classification Search
CPC ...... B23Q 1/0072; B23Q 1/282; B23Q 3/102; B25B 11/02; B25B 11/00; B25B 5/003; B25H 1/0007; B25H 1/0064; B25H 1/08; B25H 1/10; D05B 31/00; D05B 39/00; B23P 2700/50
See application file for complete search history.

(56) References Cited

U.S. PATENT DOCUMENTS

| | | | | |
|---|---|---|---|---|
| 5,499,802 | A * | 3/1996 | Haberle | ................. B23Q 3/102 269/235 |
| 5,692,357 | A * | 12/1997 | McCain | ............. E04F 21/0076 33/528 |
| 2011/0121504 | A1* | 5/2011 | Krohmer | ............... B25B 11/002 29/428 |

FOREIGN PATENT DOCUMENTS

| | | |
|---|---|---|
| CN | 210414254 U | 4/2020 |
| KR | 1020040019785 A | 3/2004 |

(Continued)

OTHER PUBLICATIONS

Chinese Office Action dated Apr. 15, 2023; Appln. No. 202111318099.6.

*Primary Examiner* — Tyrone V Hall, Jr.

(57) ABSTRACT

The present invention provides a jig apparatus for manufacturing vehicle seats. The jig apparatus includes a main frame located in an outermost area of the jig apparatus, leg units respectively located on upper and lower surfaces of the main frame, each of the leg units including two or more leg parts provided adjacent to each other such that one end of each of the two or more leg parts is moved along the main frame and a remaining end of each of the two or more leg parts extends towards an inside of the main frame, and jig units configured to fix a target object located inside the main frame, and located at the remaining ends of the two or more leg parts provided adjacent to each other so as to vary a distance between the remaining ends of the two or more leg parts.

8 Claims, 3 Drawing Sheets

(56) References Cited

FOREIGN PATENT DOCUMENTS

| KR | 1020170075082 | A | 7/2017 |
|----|---------------|----|--------|
| KR | 102098703 | B1 | 4/2020 |

\* cited by examiner

SIZE ENLARGEMENT/REDUCTION THROUGH
LEFTWARD AND RIGHTWARD SLIDING

SIZE ENLARGEMENT/REDUCTION THROUGH
LEFTWARD AND RIGHTWARD SLIDING

JIG APPARATUS FOR MANUFACTURING VEHICLE SEATS

CROSS-REFERENCE TO RELATED APPLICATION

This application claims the benefit of Korean Patent Application No. 10-2020-0153306 filed on Nov. 17, 2020, the entirety of which are incorporated herein by reference.

BACKGROUND

(a) Technical Field

The present disclosure relates to a jig apparatus for manufacturing vehicle seats. More particularly, it relates to a jig apparatus for manufacturing vehicle seats, which is configured to fix the covering unit of a vehicle seat so as to punch and quilt the covering unit and is capable of varying the positions of jig units depending on designated positions of the covering unit required to be fixed.

(b) Background Art

A vehicle leather seat is mounted in a vehicle and is provided with the surface formed of leather so that a passenger may sit on the vehicle leather seat, and the interior material for vehicle leather seats forms the surface of the vehicle leather seat.

In general, the interior material for vehicle leather seats includes a base material, such as a foam material, and leather, such as artificial leather or natural leather, as a covering unit adhered to the base material.

Conventionally, in order to manufacture the interior material for vehicle leather seats, the base material is spread manually, and the leather is also placed thereon manually and is then adhered thereto.

Further, as vehicles are being developed towards a high-quality trend, vehicle leather seats tend to be punched and quilted so as to satisfy the high-quality trend of vehicles and, in order to achieve the punched and quilted design of the vehicle leather seats, an apparatus for fixing a leather cutting product formed in a rectangle is required.

However, according to the above-described conventional method for manufacturing vehicle leather seats, all processes are performed manually, and thus, the quality of a manufactured interior material for vehicle leather seats may be lowered and a lot of time and costs may be taken to manufacture the interior material.

In order to solve the above drawbacks, a jig configured to provide guidance to a position at which a covering unit is located on a base material is used, but in this case, the position of the jig is fixed and thus jigs respectively corresponding to various types of vehicle leather seat interior materials required to manufacture various vehicles leather seats must be manufactured, thereby causing excessive manufacturing costs and inconvenience in transportation and installation of the respective jigs.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve the above-described problems associated with the prior art, and it is an object of the present invention to provide a jig apparatus for manufacturing vehicle seats which may cope with the shape of a vehicle seat interior material.

It is another object of the present invention to provide a jig apparatus for manufacturing vehicle seats which provides jig units movable inside a main frame so as to fix the covering unit of a vehicle seat at various positions.

In one aspect, the present invention provides a jig apparatus for manufacturing vehicle seats, a main frame located in an outermost area of the jig apparatus, leg units respectively located on upper and lower surfaces of the main frame, each of the leg units including two or more leg parts provided adjacent to each other such that one end of each of the two or more leg parts is moved along the main frame and a remaining end of each of the two or more leg parts extends towards an inside of the main frame, and jig units configured to fix a target object located inside the main frame, and located at the remaining ends of the two or more leg parts provided adjacent to each other so as to vary a distance between the remaining ends of the two or more leg parts.

In an embodiment, each of the leg units may include connection links coupled to a rail located on the main frame, first leg parts respectively coupled to the connection links, second leg parts configured such that each of the second leg parts surrounds at least a portion of a corresponding one of the first leg parts and extends along the corresponding one of the first leg parts in a length direction, and leg fixing members configured such that each of the leg fixing members fixes a corresponding one of the first leg parts and a corresponding one of the second leg parts.

In another embodiment, each of the connection links may include a first plate located inside the rail, a second pate located outside the rail, and a rod part located between the first plate and the second plate and including a screw thread formed on one surface of the rod part opposite the rail so as to be rotated so that each of the connection links is fixed to the rail.

In still another embodiment, when the rod part is rotated along an outer surface of the rail, the first plate may be located to face an inner surface of the rail, and the second plate may be located to face an outer surface of the rail.

In yet another embodiment, each of the jig units may include a first jig part provided with one end coupled to one of the two or more leg parts, a second jig part configured to surround at least a portion of the first jig part and coupled to a remaining one of the two or more leg parts adjacent to the leg part coupled to the first jig part, and a jig fixing member located on the second jig part and configured to fix the first jig part and the second jig part.

In still yet another embodiment, the jig apparatus may further include fixing units configured to integrally couple the jig units located on upper and lower ends of the main frame.

In a further embodiment, the fixing units are located on side surfaces of the second jig parts of the jig units located at corresponding positions of the upper and lower ends of the main frame.

In another further embodiment, the jig apparatus may further include non-slip protrusions provided on at least one surface of each of the second jig parts of the jig units located on the upper and lower ends of the main frame opposite each other.

Other aspects and embodiments of the invention are discussed infra.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

Figure 1:
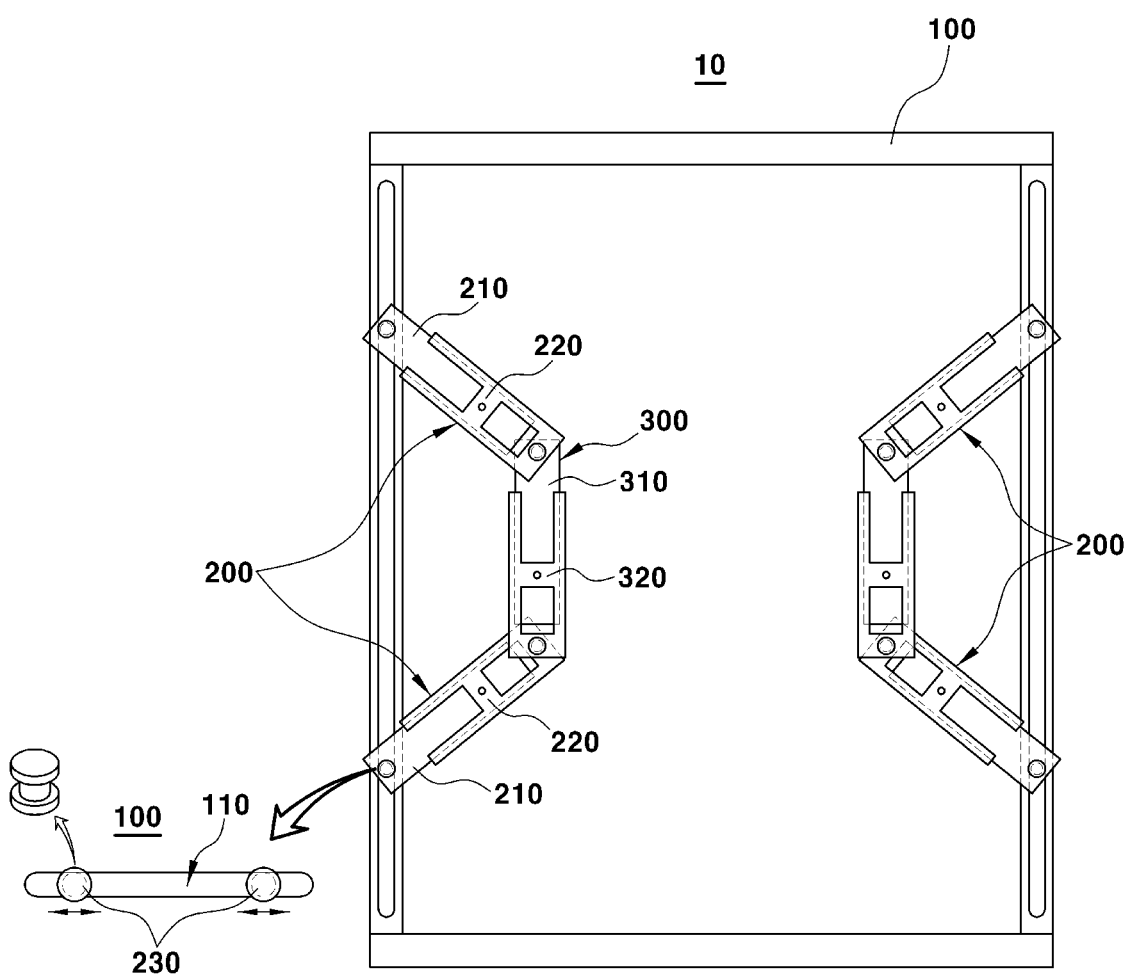
FIG. 1 is a front view of a jig apparatus for manufacturing vehicle seats according to one embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Hereinafter, reference will be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments, which may be included within the spirit and scope of the invention as defined by the appended claims. The embodiments are provided to make the description of the present invention thorough and to fully convey the scope of the present invention to those skilled in the art.

In the following description of the embodiments, it will be understood that the suffixes "part", "unit", "frame" and the like indicate units for processing at least one function or operation, and may be implemented using hardware or a combination of hardware.

Further, in the following description of the embodiments, terms, such as "first" and "second", are used only to distinguish one element from other elements, and these terms should not be construed as being limiting with regard to the sequence thereof.

In addition, the upper (front) surface and the lower (rear) surface of a component in the following description of the embodiments denote the relative positions of the component based on a main frame 100 on which a covering unit 500 is located, and are not limited to these positions.

Hereinafter, reference will be made in detail to various embodiments of the present invention, examples of which are illustrated in the accompanying drawings and described below. In the following description of the embodiments with reference to drawings, the same or similar elements are denoted by the same reference numerals even though they are depicted in different drawings, and a detailed description thereof will be omitted when it may make the subject matter of the present invention rather unclear. Therefore, in the following description of the embodiments, based on one of a plurality of leg units, combination relations between a main frame, to which the leg units are coupled, and a jig unit will be described below.

The present invention relates to a jig apparatus 10 configured to process a covering unit for vehicle seats, and more particularly, to a jig apparatus 10 configured to fix a covering unit 500 so as to punch and quilt the covering unit 500.

The jig apparatus 10 according to the present invention may be located on a punching apparatus, or may be located on a work table separately from the punching apparatus.

FIG. 1 is a front view of the jig apparatus 10 for manufacturing vehicle seats according to one embodiment of the present invention.

As shown in this figure, the jig apparatus 10 includes the main frame 100 configured to surround the covering unit 500 of a vehicle seat so as to fix the covering unit 500, and leg units 200 configured such that each of the leg units 200 includes at least two leg parts moved along one side of the main frame 10. The leg units 20 are located at both sides of the main frame 100 opposite each other, and are provided on upper and lower parts of the main frame 100 so as to correspond to each other.

That is, the leg units 200 according to the present invention are provided at left and right sides of the upper and lower surfaces of the main frame 100 so as to correspond to each other, and thus, the jig apparatus 10 includes at least four leg units 200.

In one embodiment of the present invention, the leg units 200 are configured such that each of the leg units includes two leg parts, and are respectively located at long sides of the main frame 100. Particularly, the leg units 200 are respectively coupled to the upper and lower surfaces of the long sides of the main frame 100. That is, the present invention discloses the jig apparatus 10 for manufacturing vehicle seats, which includes four leg units 200.

A jig unit 300 is located between corresponding ends of the leg parts adjacent to each other. The jig unit 300 is provided between the adjacent ends of the leg parts of each of the leg units provided on the upper and lower surfaces of the main frame 100 so as to correspond to each other. Therefore, the jig units 300 are provided at the ends of the leg units 200 coupled to the upper and lower surfaces of the main frame 100 so as to face each other.

The jig units 300, which are located on the upper and lower surfaces of the main frame 100 so as to correspond to each other, are configured such that each of the jig units 300 fixes one end of the covering unit 500 fixed to the inside of the main frame 100, and more preferably, are configured such that the covering unit 500 is fixed between the upper jig units 300 and the lower jig units 300. Further, the covering unit 500 is configured to be held by the jig apparatus 10 in the state in which at least the left and right sides or at least the upper or lower sides of the covering unit 500 are fixed due to the configuration of the jig units 300 configured to correspond to the left and right parts or the upper and lower parts of the main frame 100.

The covering unit 500 is seated between the jig units 300 provided at the corresponding positions on the upper and lower surfaces of the main frame 10, and at least a part of one side of the covering unit 500 is inserted into a space between the jig units 300 provided at the upper and lower positions of the main frame 100 so as to be fixed. Further, the jig units 300 are configured to be provided at two or more positions on the upper and lower surfaces of the main frame 100, thereby being capable of restricting movement of the covering unit 500 in the leftward and rightward directions or in the upward and downward directions.

The jig units 300 respectively located on the upper and lower surfaces of the covering unit 500 are configured such that each of the upper jig units 300 and a corresponding one of the lower jig units 300 are fixed by a fixing unit 600, and thereby, upward and downward movement of the jig units 300 is restricted so as to firmly fix the covering unit 500 between the jig units 300.

Figure 2:
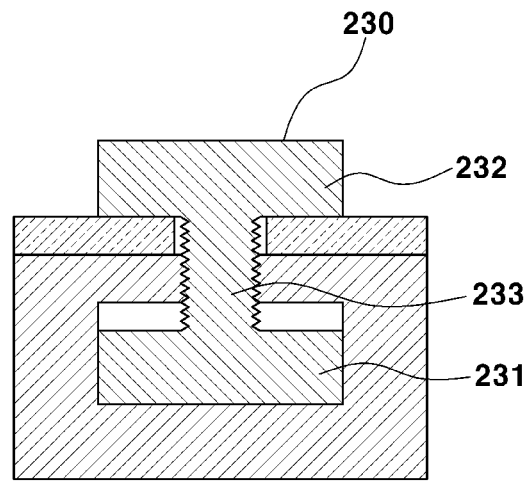
FIG. 2 is a longitudinal-sectional view of the combination structure of a connection link of the jig apparatus for manufacturing vehicle seats according to one embodiment of the present invention.
Figure 3:
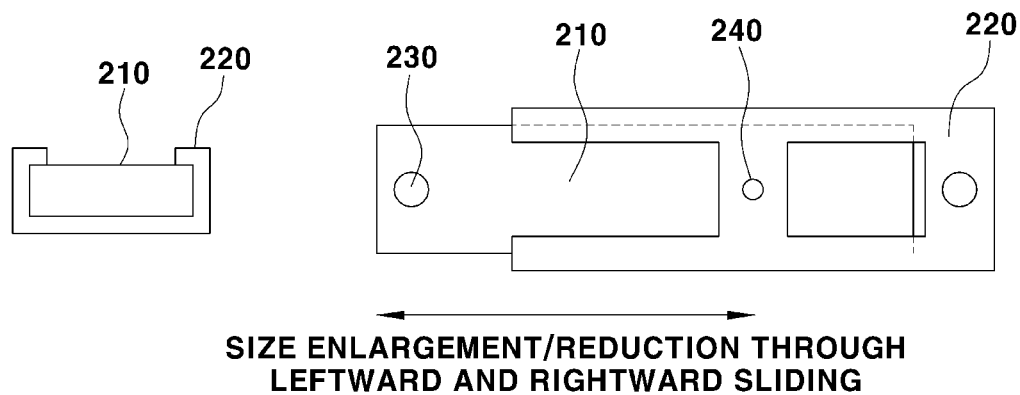
FIG. 3 is a view illustrating combination relations of a leg unit according to one embodiment of the present invention.

FIGS. 2 and 3 illustrate combination relations between the leg unit 200 and the main frame 100 and combination relations between a first leg part 210 and a second leg part 220.

The leg units 200 are configured to be movable along rails 110 located on the main frame 100, and more preferably, connection links 230 of the leg unit 200 are configured to be moved along the rail 110 in the length direction of one side of the main frame 100. Further, the rails 110 are located on the upper and lower surfaces of the main frame 100, and the leg units 200 are provided on the upper end lower ends of the main frame 100 so as to correspond to each other and configured such that each of the leg units 200 is movable along one side of the main frame 100.

Each of the leg units 200 includes the connection links 230 configured to be coupled to the rail 110, the first leg parts 210 coupled to the connection links 230 and configured to extend towards an opening formed inside the main frame 100, and the second leg parts 220 provided such that each of the second leg parts 220 surrounds at least a portion of a corresponding one of the first leg parts 210 and configured to extend in the length direction of the first leg parts 210. Further, each of the leg units 200 further includes leg fixing members 240 configured to fix the first leg parts 210 and the second leg parts 220 in the length direction in the state in which the second leg parts 220 extends from the first leg parts 210. The first leg parts 210 coupled to the connection links 230 are configured to be rotatable about the connection links 230.

Each of the fixing members 240 is provided as a rod passing through the first leg part 210 and the second leg part 220, and includes fixing pins provided at the upper and lower ends of the fixing member 240 so as to fix the first leg part 210 and the second leg part 220.

As shown in FIG. 2, the connection link 230 includes a first plate 231 inserted into the rail 110 of the main frame 100 so as to prevent release of the connection link 230 from the rail 110, and a second plate 232 provided at a position of the connection link 230 adjacent to the outer surface of the rail 110. The connection link 230 further includes a rod part 233 located between the first plate 231 and the second plate 232.

The rod part 233 is located between the first plate 231 and the second plate 232, and includes a male screw thread formed on the side surface of the rod part 233 opposite the rail 110. The male screw thread formed on the rod part 233 may move along a female screw thread formed on the side surface of the rail 110, and the first plate 231 may be located to come into contact with the inner bottom surface of the rail 110 and the second plate 232 may be located to come into contract with the outer surface of the rail 110 depending on rotation of the rod part 233. That is, the connection link 230 may move along the main frame 100. The connection link 230 may be fixed to the rail 110 depending on rotation of the rod part 233 at a designated position.

FIG. 3 illustrates the combination relations between the first leg part 210 and the second leg part 220, the first leg part 210 may be inserted into an insertion groove of the second leg part 220, and at least a portion of one surface of the second leg part 220 is open so as to confirm the position of the first leg part 210.

The leg fixing member 240 may be an elastic member which is located on the upper surface of the second leg part 220 so as to apply pressure to the first leg part 210, or may be a leg fixing pin which is inserted into a fixing recess formed in the first leg part 210. As such, the leg fixing member 240 may be configured to restrict movement of the first leg part 210 and the second leg part 220 in the length direction.

That is, the connection links 230 of the leg units 200 are fixed to the rails 110 and the first leg parts 210 and the second leg parts 220 are fixed to designated positions of the main frame 100 by the leg fixing members 240 so that both ends of the covering unit 500 located on the main frame 100 are fixed onto the main frame 100.

Figure 4:
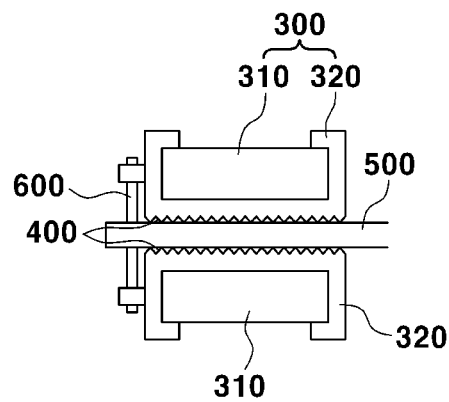
FIG. 4 is a longitudinal-sectional view of a jig unit of the jig apparatus for manufacturing vehicle seats according to one embodiment of the present invention.
Figure 5:
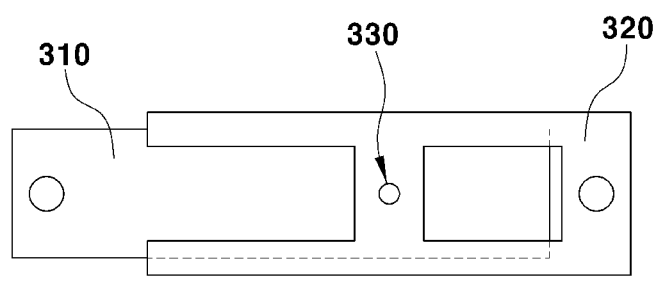
FIG. 5 is a view illustrating combination relations of upper and lower ends of the jig unit according to one embodiment of the present invention.

FIGS. 4 and 5 illustrate the structure of the jig unit 300 according to one embodiment of the present invention.

One end of each of the jig units 300 is located on one leg part so as to rotatable, and the jig units 300 are located on the upper and lower ends of the covering unit 500. More particularly, the jig unit 300 includes a second jig part 320 located to come into contact with the covering unit 500 and configured such that a first jig part 310 is inserted into the second jig pat 320.

The first jig part 310 is configured to extend from the second jig part 320, and the jig unit 300 further includes a jig fixing member 330 configured to fix the first jig part 310 and the second jig part 320 so as to correspond to a designated position of the inner surface of the main frame 100. More preferably, the second jig part 320 is configured to surround at least a portion of the first jig part 310, and is coupled to the leg part adjacent to the leg part to which the first jig part 310 is coupled.

The jig fixing member 330 is configured to pass through the first jig part 310 and the second jig part 320, includes fixing pins provided at the upper and lower surfaces of the jig fixing member 330, and is fixed to the first jig part 310 and the second jig part 320 so as to restrict movement of the first jig part 310 and the second jig part 320 in the length direction.

The second jig parts 320 of the jig units 300 provided at the corresponding positions of the upper and lower ends of the covering unit 500 are configured to substantially come into contact with the covering unit 500, and at least a part of the covering unit 500 is fixed between the second jig parts 320 located at the corresponding positions of the upper and lower surfaces of the covering unit 500. Further, non-slip protrusions 400 are provided on one surface of each of the second jig parts 320 opposite the covering unit 500, and serve to increase fixing force of the contact surface of the jig unit 300 coupled to the covering unit 500.

The non-slip protrusions 400 may include micro-sized protrusions, and more preferably, may include protrusions having a size which leaves no trace of compression on the covering unit 500 due to the second jig part 320.

More preferably, the jig apparatus 10 for manufacturing vehicle seats in one embodiment of the present invention includes the fixing units 600 configured to simultaneously fix the second jig parts 320 located on the upper end of the covering unit 500 and the second jig parts 320 located on the lower end of the covering unit 500. The fixing units 600 are located on the side surfaces of the second jig parts 320 located on the upper and lower surfaces of the covering unit 500, and are configured to more strongly fix the covering unit 500 located between the second jig parts 320 depending on the amount of rotation or the amount of pressurization of the fixing units 600.

The jig fixing member 330 may be an elastic member which is located on the second jig part 320 so as to apply pressure to the first jig part 310, or may be a pin-type coupling structure configured to integrally fix the first jig part 310 and the second jig part 320. Therefore, the jig fixing member 330 restricts movement of the jig unit 300, configured to fix the covering unit 500, in the length direction.

As described above, the jig apparatus 10 for manufacturing vehicle seats may locate the jig units 300 so as to cope with the shape of the covering unit 500 held inside the main frame 100 based on the configuration of the leg parts having different lengths, and may vary the length of the jig units 300 depending on the length of the covering unit 500 required to be fixed, thereby being capable of coping with any one of various types of covering units 500.

As is apparent from the above description, the present invention provides the following effects through the above-described configuration and connection and usage relations.

A jig apparatus for manufacturing vehicle seats according to the present invention provides jig units configured to be extendable towards the inside of a main frame, thereby being capable of achieving process simplification.

Further, the jig apparatus for manufacturing vehicle seats according to the present invention provides leg units configured to be extendable in the length direction of the main frame, thereby being capable of fixing various shapes of covering units for vehicle seats.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents. That is, while the invention has been explained in relation to embodiments thereof, it is to be understood that various modifications thereof will become apparent to those skilled in the art upon reading the specification. These embodiments have been described to explain the best mode to implement the technical scope of the invention, and various modifications required in the specific application and purpose of the present invention are possible. Therefore, the above detailed description of the present invention is not intended to limit the invention. Further, it must be interpreted that the accompanying claims encompass other modes.

What is claimed is:

1. A jig apparatus for manufacturing vehicle seats, comprising:
   a main frame located in an outermost area of the jig apparatus;
   leg units respectively located on upper and lower surfaces of the main frame, each of the leg units comprising two or more leg parts provided adjacent to each other such that one end of each of the two or more leg parts is moved along the main frame and a remaining end of each of the two or more leg parts extends towards an inside of the main frame; and
   jig units configured to fix a target object located inside the main frame, and located at the remaining ends of the two or more leg parts provided adjacent to each other so as to vary a distance between the remaining ends of the two or more leg parts;
   wherein each jig unit includes
      a first jig part provided with one end coupled to one of the two or more leg parts;
      a second jig part configured to connect to the first jig part and coupled to a remaining one of the two or more leg parts adjacent to the leg part coupled to the first jig part;
      the first jig part and the second jig part being configured to move in relation to one another and adjust the distance between the leg parts; and
      each jig unit includes a jig fixing member located on the second jig part, the jig fixing member being configured to inhibit movement between the first jig part and the second jig part by fixing the first jig part and the second jig part.

2. The jig apparatus of claim 1, wherein each of the leg units comprises:
   connection links coupled to a rail located on the main frame;
   first leg parts respectively coupled to the connection links;
   second leg parts configured such that each of the second leg parts surrounds at least a portion of a corresponding one of the first leg parts and extends along the corresponding one of the first leg parts in a length direction; and
   leg fixing members configured such that each of the leg fixing members fixes a corresponding one of the first leg parts and a corresponding one of the second leg parts.

3. The jig apparatus of claim 2, wherein each of the connection links comprises:
   a first plate located inside the rail;
   a second pate located outside the rail; and
   a rod part located between the first plate and the second plate, and comprising a screw thread formed on one surface of the rod part opposite the rail so as to be rotated so that each of the connection links is fixed to the rail.

4. The jig apparatus of claim 3, wherein, when the rod part is rotated along an outer surface of the rail, the first plate is located to face an inner surface of the rail, and the second plate is located to face an outer surface of the rail.

5. The jig apparatus of claim 1, wherein
   the second jig part of each jig unit is configured to surround at least a portion of the first jig part of each jig unit.

6. The jig apparatus of claim 1, further comprising fixing units configured to integrally couple the jig units located on upper and lower ends of the main frame.

7. The jig apparatus of claim 6, wherein the fixing units are located on side surfaces of second jig parts of the jig units located at corresponding positions of the upper and lower ends of the main frame.

8. The jig apparatus of claim 6, further comprising non-slip protrusions provided on at least one surface of each of second jig parts of the jig units located on the upper and lower ends of the main frame opposite each other.

* * * * *